US011112926B1

(12) United States Patent
Lohrmann (10) Patent No.: US 11,112,926 B1
(45) Date of Patent: Sep. 7, 2021

(54) USER INTERFACE SYSTEM FOR DISPLAY SCALING EVENTS

(71) Applicant: Advanced Micro Devices, Inc., Santa Clara, CA (US)

(72) Inventor: Peter James Lohrmann, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/085,597

(22) Filed: Oct. 30, 2020

Related U.S. Application Data

(60) Provisional application No. 63/083,599, filed on Sep. 25, 2020.

(51) Int. Cl.
*G06F 3/048* (2013.01)
*G06T 3/40* (2006.01)

(52) U.S. Cl.
CPC ............... *G06F 3/048* (2013.01); *G06T 3/40* (2013.01); *G06F 2203/04806* (2013.01)

(58) Field of Classification Search
CPC .. G06F 3/048; G06F 2203/04806; G06T 3/40
See application file for complete search history.

(56) References Cited

U.S. PATENT DOCUMENTS

| 5,513,342 | A | * | 4/1996 | Leong | ..................... G06F 9/451 715/798 |
| 5,760,772 | A | * | 6/1998 | Austin | .................. G06F 3/0481 715/798 |
| 8,327,288 | B1 | * | 12/2012 | Herrmann | ........... G06F 3/04886 715/788 |
| 2008/0282188 | A1 | * | 11/2008 | Hays | ........................ G06F 8/34 715/788 |
| 2016/0048307 | A1 | * | 2/2016 | Troyer | .................... G06F 9/454 715/801 |

* cited by examiner

*Primary Examiner* — Shen Shiau
(74) *Attorney, Agent, or Firm* — Rory D. Rankin; Kowert, Hood, Munyon, Rankin & Goetzel, P.C (57) ABSTRACT

Systems, apparatuses, and methods for implementing enhanced scaling techniques for display objects are disclosed. When graphical content is created by an application, display objects register with a scaling manager to be notified of display scaling events. These display scaling events can be caused by changing displays, changing resolution or other parameters on a display, changing a text size, resizing one or more graphical elements, or otherwise. When a display scaling event is detected, display objects are notified of the event by the scaling manager. If a given display object makes a decision to change the amount of space it occupies based on the event, the given display object notifies its parent object of the desired change. The parent can then decide whether to allow the change and/or to make adjustments to other display objects to accommodate the change sought by the given display object.

20 Claims, 9 Drawing Sheets

USER INTERFACE SYSTEM FOR DISPLAY SCALING EVENTS

CROSS REFERENCE TO RELATED APPLICATIONS

This application claims priority to Provisional Patent Application Ser. No. 63/083,599, entitled "USER INTERFACE SYSTEM FOR DISPLAY SCALING EVENTS", filed Sep. 25, 2020, the entirety of which is incorporated herein by reference.

BACKGROUND

Description of the Related Art

When software applications run on multiple different display platforms, various display-related issues can be encountered. For example, the screens displaying content on the different platforms can have different sizes, aspect ratios, orientation, pixel density, screen resolution, and/or other parameters. Content that appears as intended on a first display might appear with various negative effects on a second display. Also, changes to display settings while an application is running can cause unintended problems to the images being displayed such as blurry text and user interface (UI) components, incorrectly sized graphical elements, and so on.

An important characteristic of displays is a parameter referred to as pixel density. Pixel density is measured in dots per inch (DPI) or pixels per inch (PPI) and is determined by the number of display pixels and pixel size. For example, in one scenario, a user interface can include a frame of 80×40 pixels around the text "Homepage". If a certain font size is used, the text "Homepage" might look correct on a low resolution screen. However, on a high resolution screen, the frame would be too small, resulting in the text being clipped. In another example, when an application is stretched to fit a secondary display, the stretching can cause the application to appear blurry on the secondary display. These and other similar problems can be challenging to overcome when generating content for display.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing enhanced scaling techniques for display objects are disclosed. In one implementation, an application generates display objects for many different types and sizes of displays, with the pixel density varying on the different types of displays. When content is created by the application, display objects register with a scaling manager to be notified of display scaling events. The scaling manager monitors for display scaling events which can be caused by an application moving from a primary display to a secondary display with a different pixel density, changing resolution or other parameters on a display, changing a text size, resizing one or more graphical elements, changing a display scale factor, or otherwise. The term "scale factor" is defined as the ratio between the size of an effective pixel and a physical pixel. The term "effective pixel" is defined as an abstract unit of the display, where each effective pixel represents a block of physical pixels. The term "physical pixel" is defined as the physical dots making up the screen. "Physical pixels" are the smallest parts of the screen that can be lit. While effective pixels are the same size on all screens, physical pixels are smaller on denser screens.

If a display scaling event is detected, the scaling manager records the display scale values of before and after the event. Also, when the display scaling event is detected, display objects that are registered with the scaling manager are notified of the display scaling event. Each display object which is notified compares the before and after display scale values to determine if a scaling change is appropriate for the display object. If a given display object makes a decision to change the amount of screenspace (in pixels) that it occupies, the given display object notifies its parent display object of the change. The parent display object can then decide whether to allow the change and/or to make adjustments to other display objects to accommodate the change being initiated by the given display object.

Figure 1:
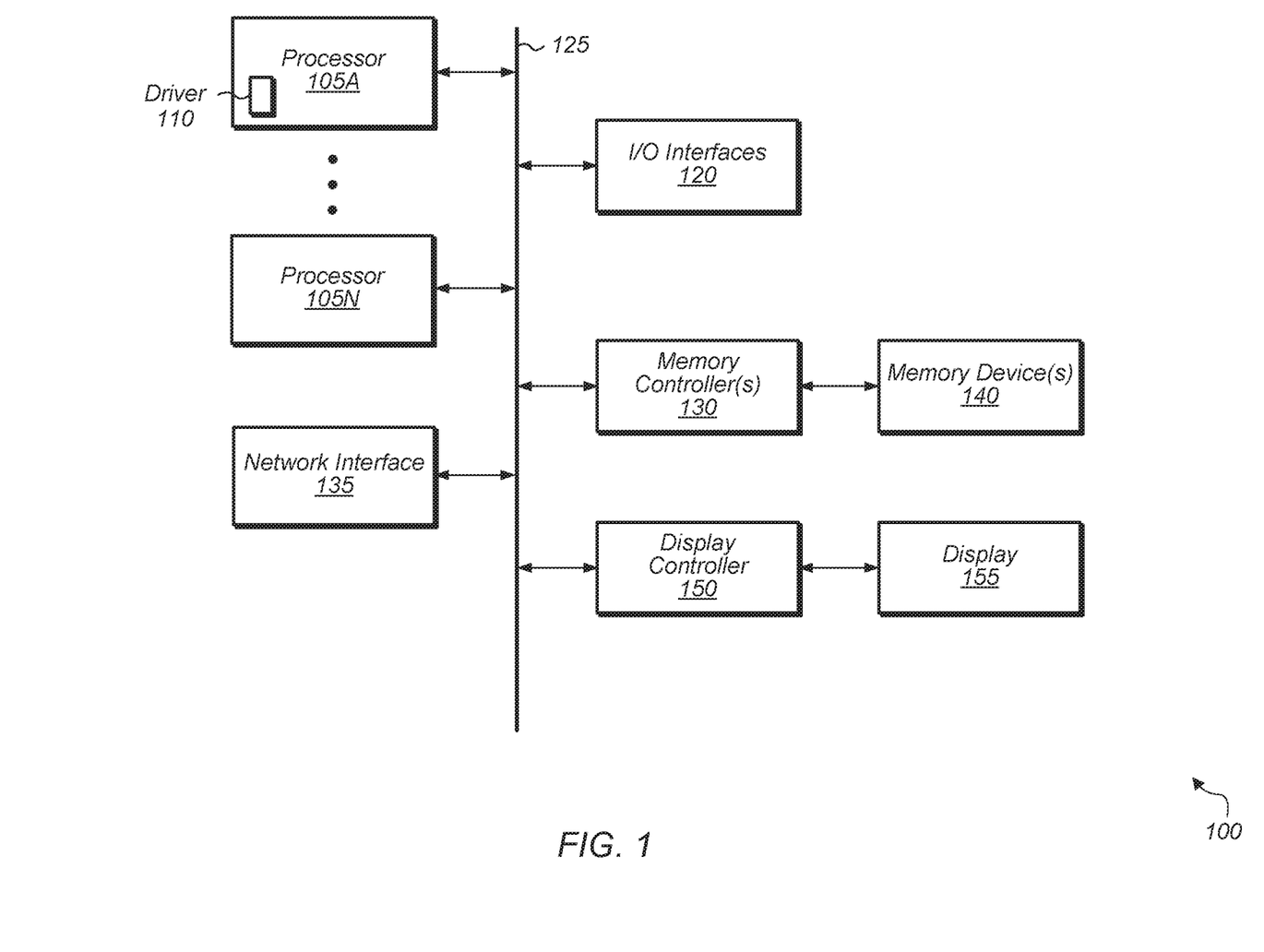
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
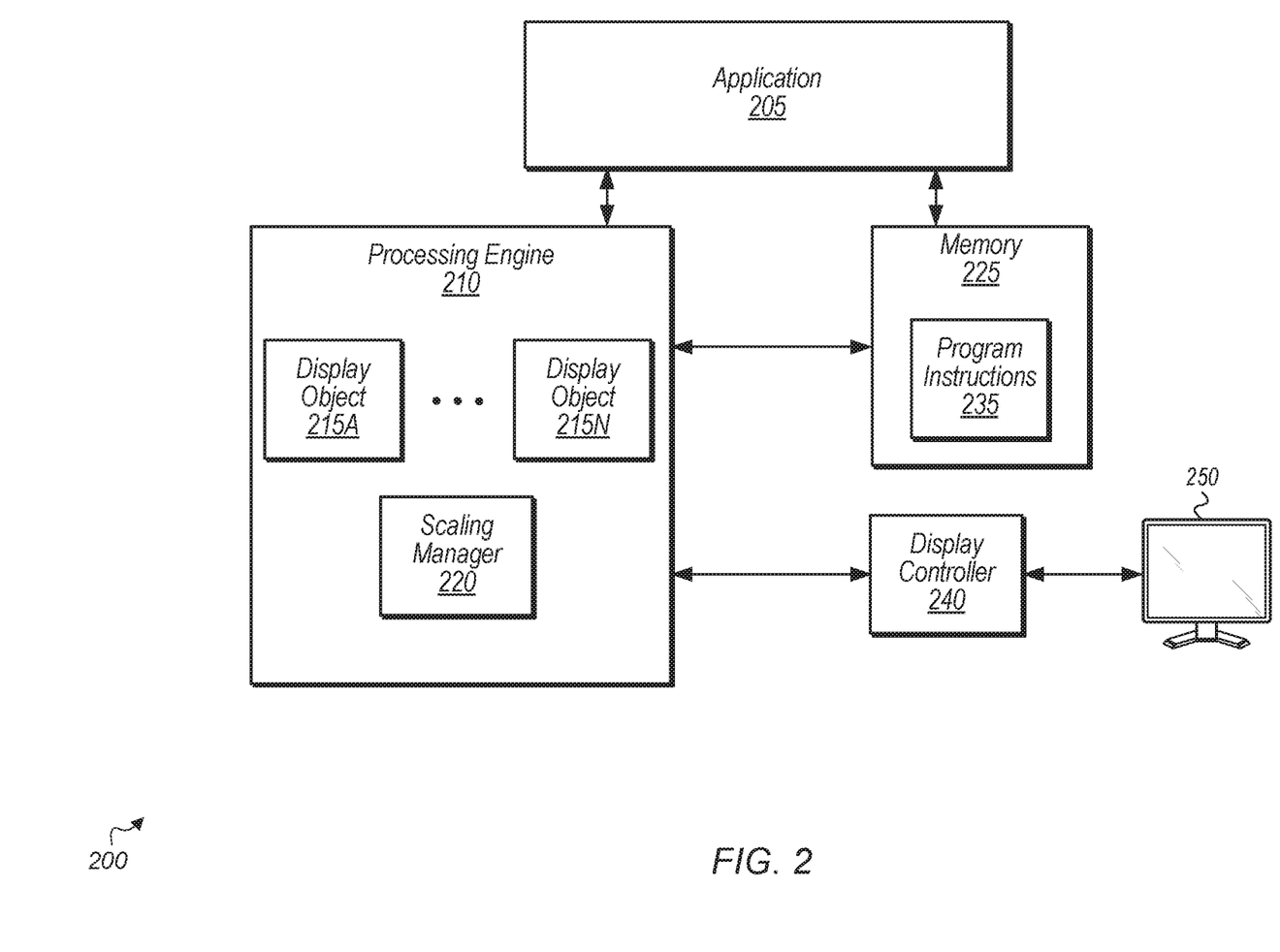
FIG. 2 is a logical block diagram of one implementation of a system for responding to changes in a display scale factor.

Turning now to FIG. 2, a logical block diagram of one implementation of a computing system 200 for responding to changes in a display scale factor is shown. In one implementation, system 200 includes components such as application 205, processing engine 210, and memory 225. Processing engine 210 can be implemented using at least a portion of one or more CPUs, GPUs, FPGAs, ASICs, DSPs, and/or other processing resources. It is noted that system 200 can also include any number and type of other components, with the composition of the other components varying from implementation to implementation. Application 205 includes program instructions 235 which are stored in memory 225 and which execute on processing engine 210. In one implementation, application 205 renders pixels to generate a user interface to be displayed on display 250.

Processing engine 210 executes the program instructions 235 which correspond to application 205. As part of executing program instructions 235, processing engine 210 generates any number of display objects 215A-N. Display objects 215A-N are representative of any number and type of display objects such as text, icons, buttons, images, graphic elements, boxes, icons, and so on. Display objects 215A-N correspond to different graphical elements which are driven to display 250 via display controller 240. It is noted that while one display controller 240 and one display 250 are shown in system 200, this is merely indicative of one implementation. In other implementations, system 200 can include multiple displays and display controllers. Processing engine 210 includes scaling manager 220 which manages the scaling of display objects 215A-N in response to the detection of a display scaling event. Examples of display scaling events include a user selecting a new resolution for a display, a user switching a laptop or computer from a first display to a second display, a user selecting a larger text setting, change in font properties, and so on. Examples of changes in font properties include increases or decreases in text size, a change in font family, a change in typeface (e.g., bold, italics), and so on. Scaling manager 220 can be implemented using any suitable combination of hardware and/or program instructions.

When content is created by application 205, corresponding display objects 215A-N register with scaling manager 220 to be notified of display scaling events. For example, when the user changes one or more display settings, such as a resolution setting, scaling manager 220 will notify those display objects 215A-N which have registered with scaling manager 220. In one implementation, display objects 215A-N include a property to indicate whether they are registered for display scaling event notifications. Scaling manager 220 monitors for display scaling events during execution of application 205. When a display scaling event is detected, the scaling manager 220 records display parameter values of before and after the display scaling event. Display objects that are registered for display scaling events are notified by scaling manager 220 of the detected display scaling event. Each display object 215A-N then makes a decision as to how the appearance of display object 215A-N will be changed. After determining if and how to change, each display object 215A-N informs a parent display object of the proposed change. This allows a child display object to have control over how the parent display object responds to the display scaling event and the actions the parent display object takes.

For example, if a user changes a text size setting to make text larger, scaling manager 220 will detect the change to the text size setting. Scaling manager 220 will record the current text size setting and the new text size setting. Scaling manager 220 will also notify those display objects 215A-N which are registered as text objects. Next, those display objects 215A-N which are registered as text objects will determine an amount to change the size of their text so as to comply with the user's text size setting change. Then, this suggested child object change will be sent to the corresponding parent display object. If the parent display object approves, then the change will be made to the child display object. The parent display object can also choose to change the size of one or more other objects that are associated with the child display object. Otherwise, if the parent display object does not approve of the change, the parent display object can reject the change. For example, if the change in size will interfere with one or more other display objects, then the change can be rejected. Also, the parent display object can determine an alternate change that would be accepted, and then the parent display object can send an indication of this alternate change to the child display object. For example, if the child display object suggested a 100% change to the text size, the parent display object can suggest a 50% change if one or more factors prevent the 100% change from being desirable.

Figure 3:
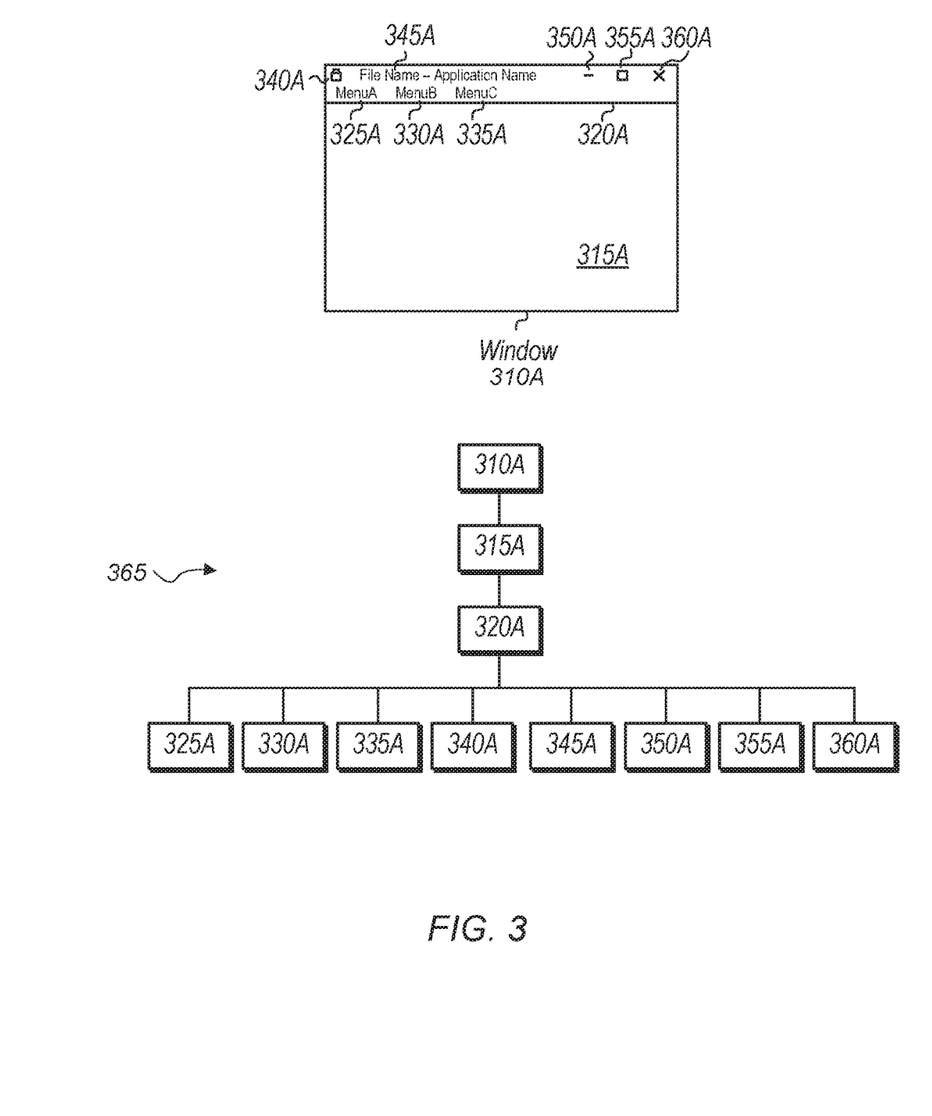
FIG. 3 is a diagram of one implementation of a user interface window and a corresponding display object hierarchy.

Referring now to FIG. 3, a block diagram of one implementation of a user interface (UI) window 310A and a corresponding display object hierarchy 365 is shown. Window 310A is one example of a window that can be displayed as part of a graphical user interface (GUI). Display object hierarchy 365 shows the hierarchy between the display objects that make up window 310A. In this example, window 310A is the parent display object at the top of the display object hierarchy 365. Background 315A is a child display object of window 310A, and toolbar 320A is a child display object of background 315A.

The other display objects include display object 325A which is the "MenuA" text representing a first pull-down menu, display object 330A which is the "MenuB" text representing a second pull-down menu, and display object 335A which is the "MenuC" text representing a third pull-down menu. Display objects 325A, 330A, and 335A are representative of any number and type of text objects which denote different types of pull-down menus whose number and type can vary according to the software application. The other display objects also include display object 340A which is the icon in the top-left corner of the window, display object 345A which is the "File Name—Application Name" text at the top of the window, display object 350A which is the "-" icon for minimizing the window, display object 355A which is the square icon for expanding the window, and display object 360A which is the "x" icon for closing the window. These display objects are representative of any number and type of display objects which can appear within a user interface. It should be appreciated that the display objects that are included within a user interface can vary from those shown in the window on the left side of FIG. 3. Also, the hierarchical relationship between display objects can include any number of layers and mappings between parent and child display objects. In general, a given parent display object can have any number of parent layers above it and any number of child layers below it.

The metadata stored in display object hierarchy 365 for each display object can include various types of parameters. For example, in one implementation, the coordinates of a display object's location on the screen are recorded within the display object hierarchy 365. The display object hierarchy 365 can be captured in a table or other suitable structure for recording the metadata and links associated with each object in hierarchy 365. Other metadata stored for each object includes margins, descriptor field(s), text size, font, color, transparency, alignment, other appearance characteristics, and so on. Also, other types of data associated with the objects of display object hierarchy 365 can also be stored and used for subsequent calculations and decisions when responding to display scaling events.

Figure 4:
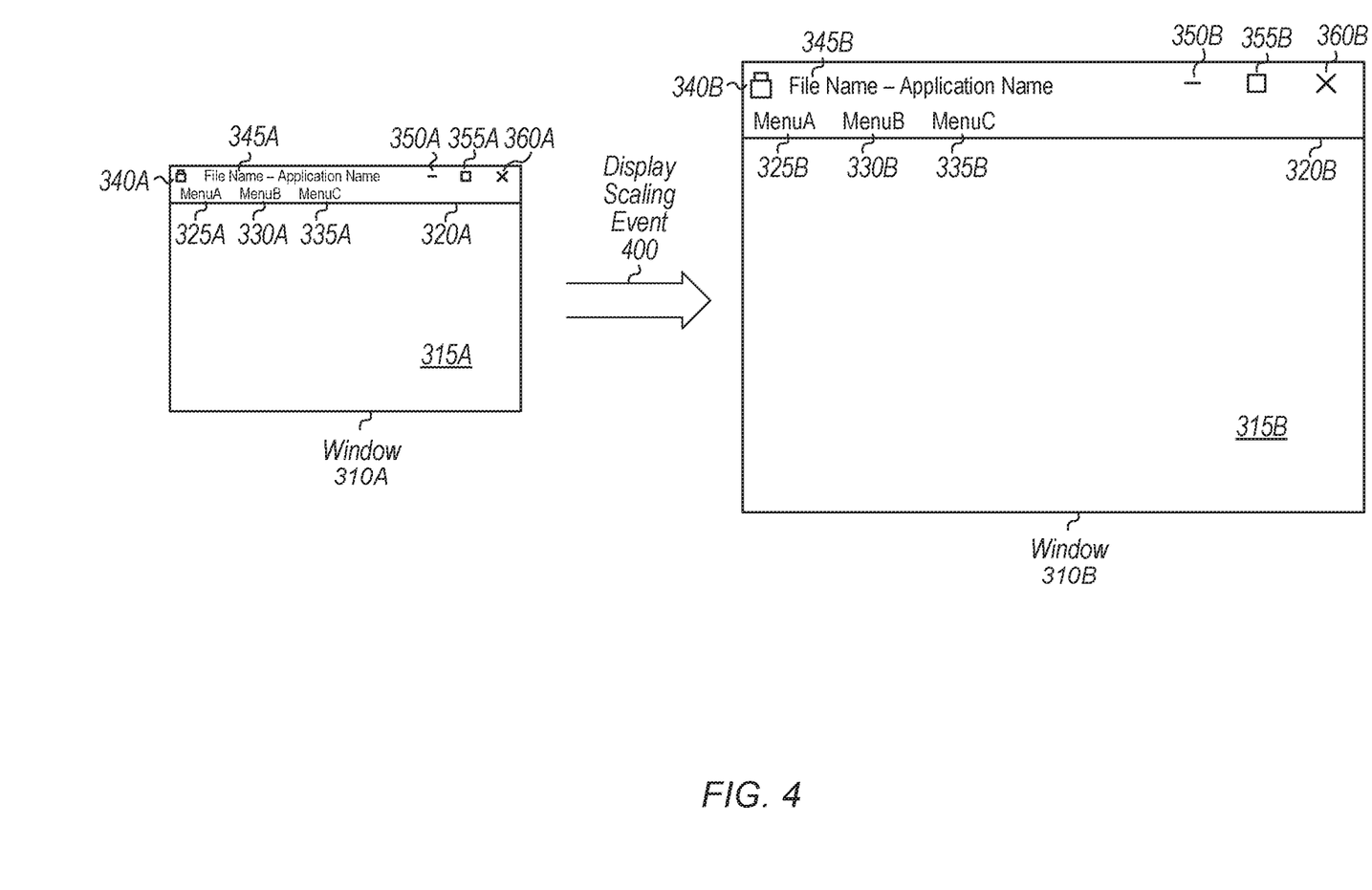
FIG. 4 is a diagram of one implementation of a rescaling scenario for a window being displayed as part of a graphical user interface.

Turning now to FIG. 4, a block diagram of one implementation of a rescaling scenario for a window being displayed as part of a graphical user interface (GUI) is shown. The discussion of FIG. 4 is intended to be a continuation of the discussion of FIG. 3. Accordingly, window 310A of FIG. 4 which is being affected by a display scaling event 400 is intended to be the same window as window 310A of FIG. 3. When the display scaling event 400 is detected, the scaling manager (e.g., scaling manager 220 of FIG. 2) will detect or be notified of display scaling event 400. Display scaling event 400 can be caused by a user changing a display setting, the user switching to a new display, or otherwise. The scaling manager records the pre-event settings and the post-event settings based on the specific change being initiated.

When the display scaling event 400 is detected, the scaling manager notifies the display objects which have registered for display scaling event notification with the scaling manager. These display objects include window 310A which is the parent display object of the display object hierarchy. Also included are background 315A and toolbar 320A. The display objects within toolbar 320A include display object 325A or "MenuA", display object 330A or "MenuB", display object 335A or "MenuC", and display objects 340A, 345A, 350A, 355A, and 360A. These display objects are representative of any number and type of display objects which can appear within a user interface.

It is assumed for the purposes of this discussion that the display scaling event 400 is a request to increase the size of the window of parent display object 310A. In other scenarios, other types of display scaling events can be detected and responded to, such as an event where a window or other collection of graphical elements is reduced in size. As a result of display scaling event 400, the display objects are scaled up and expanded as shown in the window on the right side of FIG. 4. For example, parent display object 310A is expanded to the size shown for parent display object 310B. Also, the individual display objects 320B, 325B, 330B, 335B, 340B, 345B, 350B, 355B, and 360B are also expanded as compared to their counterparts in the original window on the left-side of FIG. 4. Each display object is scaled up in this example. However, in other scenarios, some display objects can choose to adjust the scaling that is performed depending on the current settings, the size of the display, and other characteristics associated with the size of the display(s), settings of the display(s), and/or locations of the display objects within the window.

Figure 5:
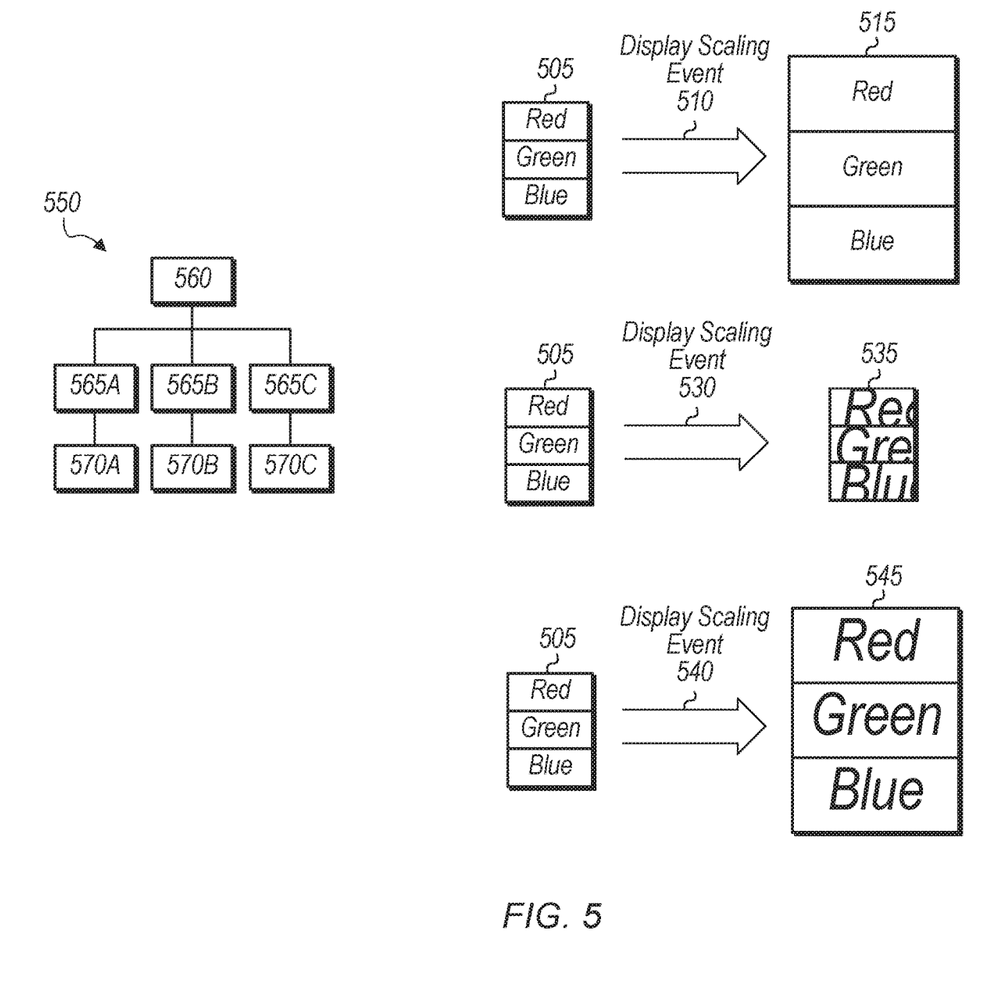
FIG. 5 illustrates examples of resizing cells of a spreadsheet in accordance with various implementations.

Referring now to FIG. 5, examples of resizing cells of a spreadsheet are shown in accordance with various implementations. When a user requests to expand the cells of a table or spreadsheet, the request can be handled differently depending on the operating system (OS), display settings, software application, and other parameters. Often times, the request does not achieve the desired effect that the user was trying to produce. For example, at the top of FIG. 5, cells 505 represent an example of three cells of a spreadsheet. If the user is having trouble reading the text, the user can change a setting to expand the spreadsheet to make it more readable. In this case, it is assumed that the user is requesting for the cells of the spreadsheet to be doubled. However, as shown at the top of FIG. 5 for display scaling event 510, in one implementation, the cells may increase in size but the text may stay the same in response to display scaling event

510. The new representation after display scaling event 510 is shown as cells 515. This was not the desired effect that the user was expecting, but the OS and application might not be able to achieve the user's desired goal because of the lack of proper information sharing.

In the middle of FIG. 5, another example of the result of a spreadsheet expansion is shown. Cells 505 are the pre-event representation of the spreadsheet, and display scaling event 530 represents the same request by the user to expand the cells. However, as shown in cells 535, the text has doubled in size, but the cells have remained fixed in size. In other words, the text is increasing in size but the amount of space allocated to the text remains unchanged. This results in the text "Red", "Green", and "Blue" not fitting in their corresponding cells. This undesirable effect can occur in some systems, again due to the miscommunication between OS and the software application.

The example at the bottom of FIG. 5 illustrates a scenario where the system achieves the desired effect. Here, the original cells 505 are intended to be doubled in size by display scaling event 540. The scaling result 545 shows the cells and text both doubling in size, resulting in a more readable version of the original cells 505. This is achieved through a proper synchronization of size adjustment between parent and child display objects using the techniques described herein.

An example display object hierarchy 550 which corresponds to the spreadsheet cells 505 is shown on the left-side of FIG. 5. The singular parent frame is represented in display object hierarchy 550 by box 560 at the top of the hierarchy 550. The individual cells holding the text are represented by boxes 565A-C and at the bottom of the hierarchy 550 are the boxes 570A-C which represent the text display objects "Red", "Green", and "Blue" of original cells 505. When the text display objects "Red", "Green", and "Blue" are notified of the change in the DPI scale or font properties, each text display object makes a decision to increase in size. Each text display object 570A-C also notifies a corresponding parent display object 565A-C. Each display object 565A-C then decides whether to accept, change, or reject the request. Each display object 565A-C can also decide whether to grow in size as well. These requests are then sent to display object 560. For the outcome which generated scaling result 545, the parent display object 560 will allow the display objects 565A-C and 570A-C to grow in lockstep with each other. Sending this response down through hierarchy 550 ensures that the desired result is achieved.

Figure 6:
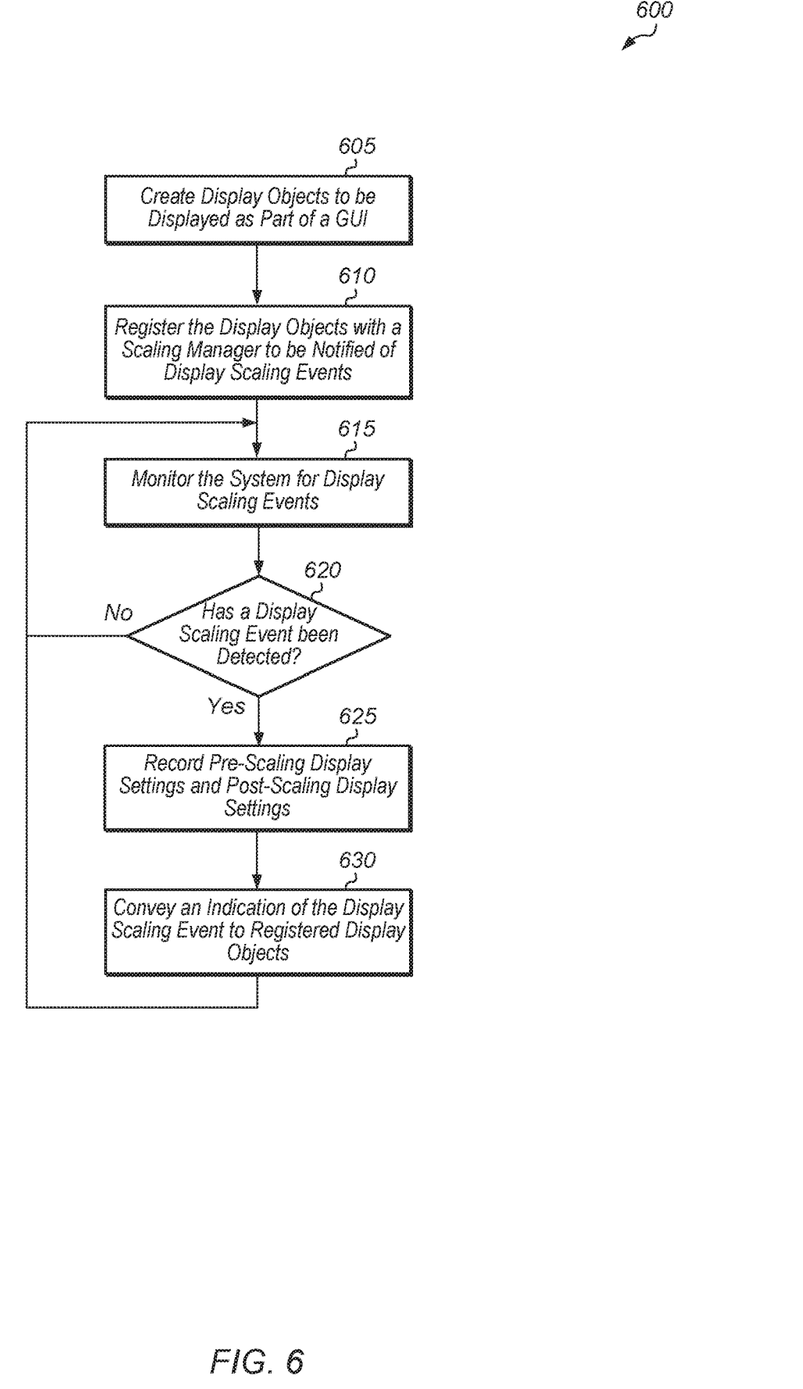
FIG. 6 is a generalized flow diagram illustrating one implementation of a method for operating a scaling manager.
Figure 7:
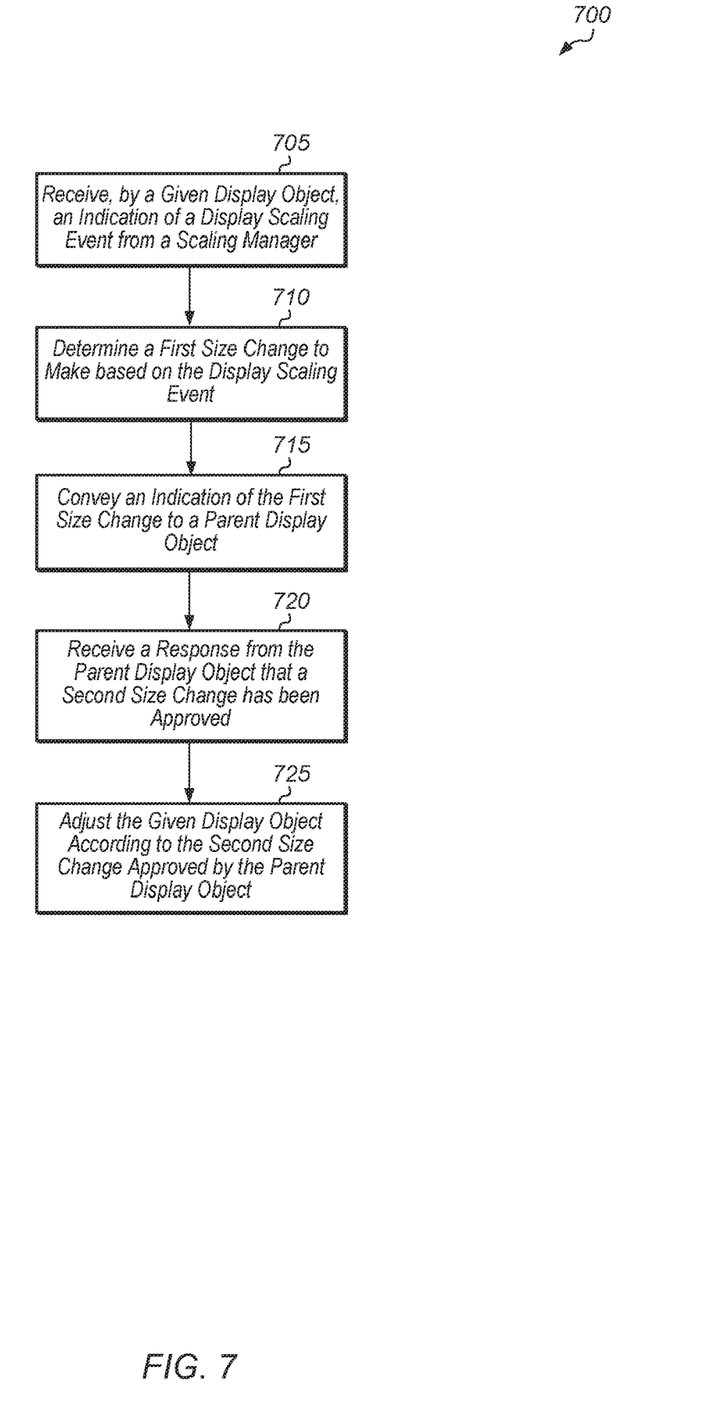
FIG. 7 is a generalized flow diagram illustrating one implementation of a method for a display object responding to receiving an indication of a display scaling event.
Figure 8:
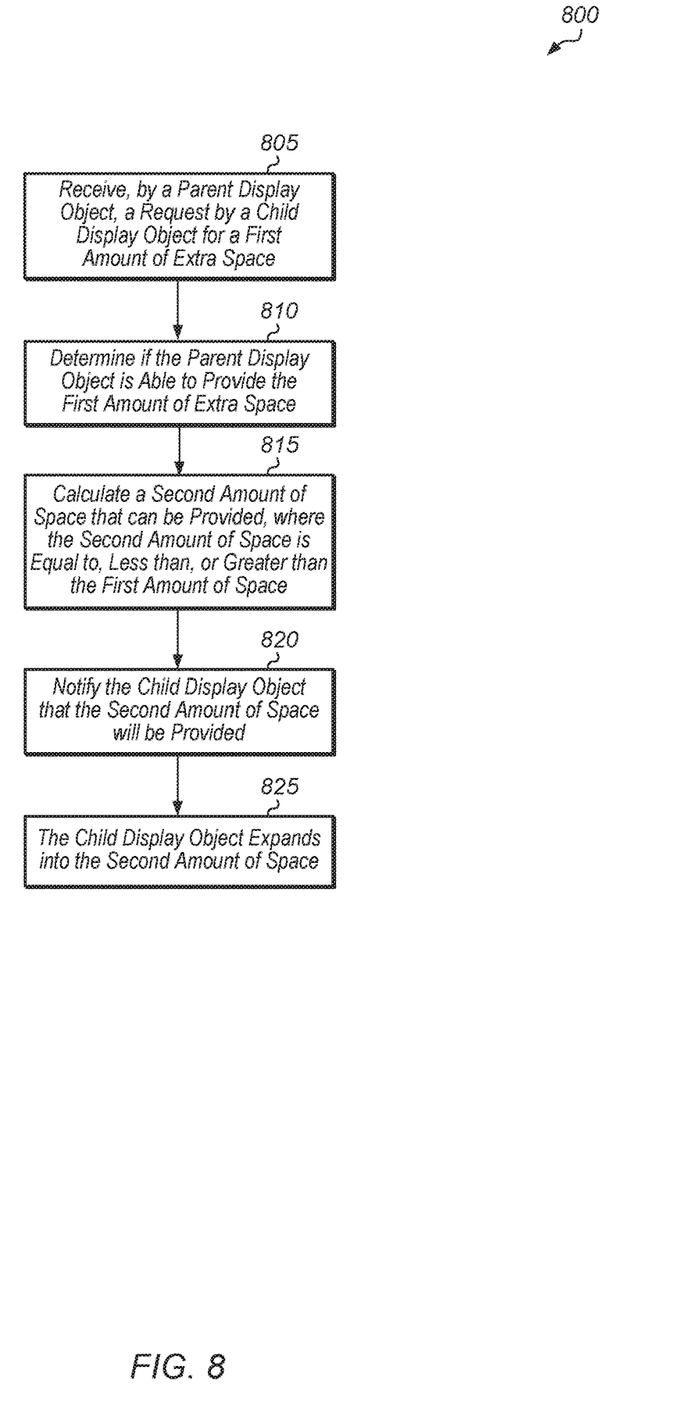
FIG. 8 is a generalized flow diagram illustrating one implementation of a method for coordinating the assignment of extra space between child and parent display objects.
Figure 9:
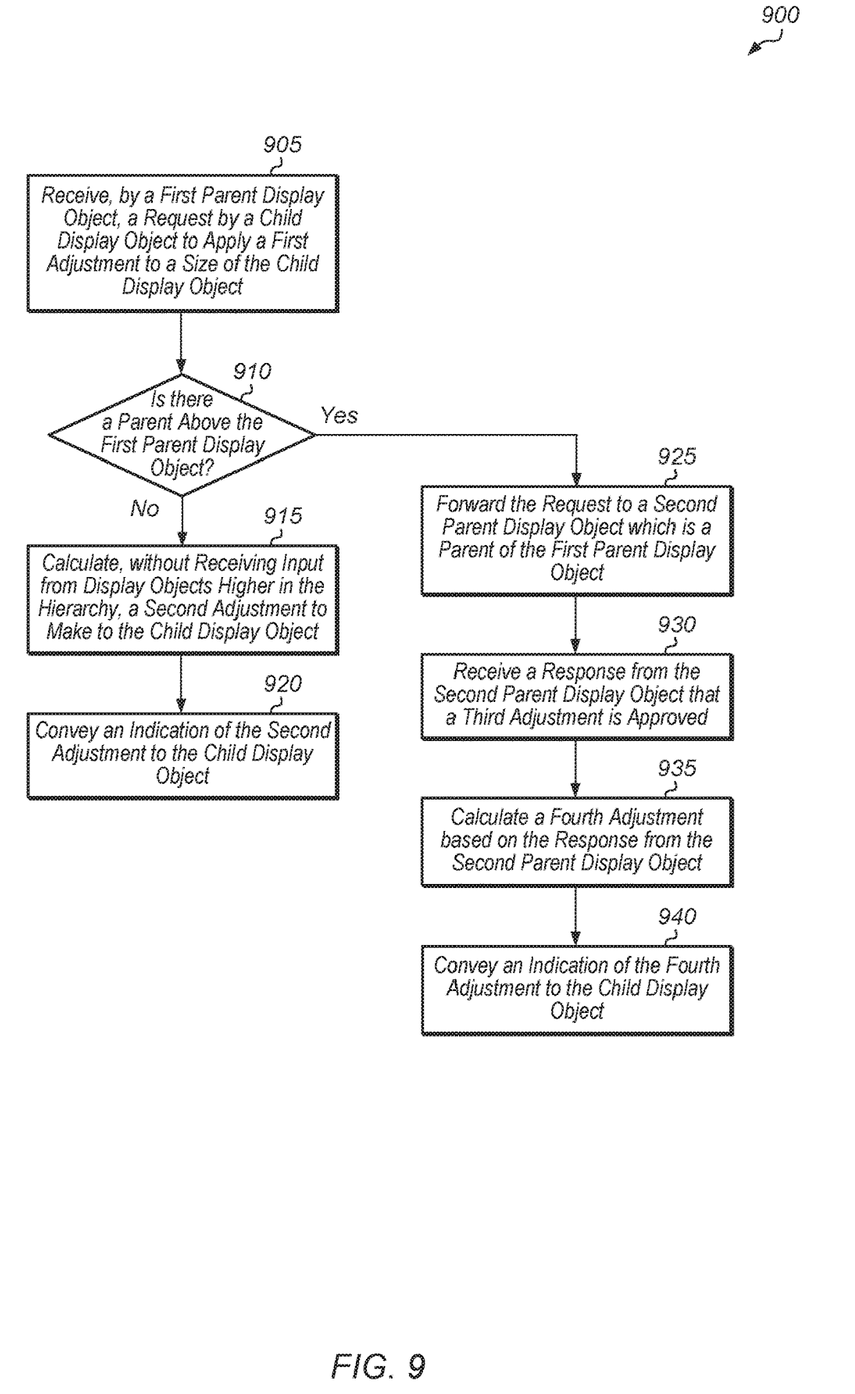
FIG. 9 is a generalized flow diagram illustrating one implementation of a method for traversing a hierarchy when a display scaling event is detected.

Referring now to FIG. 6, one implementation of a method 600 for operating a scaling manager is shown. For purposes of discussion, the steps in this implementation and those of FIG. 7-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

A software application creates display objects to be displayed as part of a graphical user interface (GUI) (block 605). When display objects are created, the display objects register with a scaling manager to be notified of display scaling events (block 610). The scaling manager monitors the system for display scaling events (block 615). Examples of display scaling events include a user changing a display setting, the user switching to a new display, and so on. Next, if a display scaling event is detected by the scaling manager (conditional block 620, "yes" leg), then the scaling manager records pre-scaling display settings and post-scaling display settings (block 625). If a display scaling event is not detected by the scaling manager (conditional block 620, "no" leg), then method 600 returns to block 615. After block 625, the scaling manager conveys an indication of the display scaling event to registered display objects (block 630). Method 700 (of FIG. 7) provides one example of a how a display object can respond when receiving an indication of a display scaling event. After block 630, method 600 returns to block 615.

Referring now to FIG. 7, one implementation of a method 700 for a display object responding to receiving an indication of a display scaling event is shown. A given display object receives an indication of a display scaling event from a scaling manager (block 705). In response to receiving the indication of the display scaling event, the given display object determines a first size change to make based on the display scaling event (block 710). It is noted that the first size change can be an increase in size or decrease in size from the given display object's current size. In one implementation, the first size change is calculated based on the pre-scaling display settings and post-scaling display settings. Next, the given display object conveys an indication of the first size change to a parent display object (block 715). Then, at a later point in time, the given display object receives a response from the parent display object that a second size change has been approved (block 720). The second size change can be greater than, less than, or equal to the first size change. Next, the given display object is adjusted according to the second size change approved by the parent display object (block 725). After block 725, method 700 ends.

Turning now to FIG. 8, one implementation of a method 800 for coordinating the assignment of extra space between child and parent display objects is shown. A parent display object receives a request by a child display object for a first amount of extra space (block 805). The quantity of the first amount of extra space can vary according to the implementation. For example, in one implementation, the first amount could be expressed in terms of a number of pixels of screenspace, such as 100 horizontal pixels and 100 vertical pixels. In one implementation, the parent display object is an application generating a user interface and the child display object is text, an image, a button, an icon, or otherwise. In other implementations, the parent display object and/or the child display object can be other types of objects. In response to receiving the request, the parent display object determines if the parent display object is able to provide the first amount of extra space (block 810). The parent display object can factor in the size, resolution, DPI, and other parameters of the display, borders of the user interface, and the size and locations of other graphical elements in the user interface being displayed. The parent display object determines if there will be clipping or if the location will overlap with other graphical elements based on these and other factors.

Next, the parent display object calculates a second amount of space that can be provided, where the second amount of space is equal to, less than, or greater than the first amount of space (block 815). Then, the parent display object notifies the child display object that the second amount of space will be provided (block 820). Next, the child display object expands into the second amount of space (block 825). After block 825, method 800 ends.

Referring now to FIG. 9, one implementation of a method 900 for traversing a hierarchy when a display scaling event is detected is shown. A first parent display object receives a request by a child display object to apply a first adjustment to a size of the child display object (block 905). The first adjustment can be an increase or a decrease in the size of the child display object. If there is not a parent above the first parent display object in the hierarchy (e.g., display object hierarchy 365 of FIG. 3) (conditional block 910, "no" leg), then the first parent display object calculates, without input from display objects higher in the hierarchy, a second adjustment to make to the child display object (block 915). The second adjustment can be greater than, less than, or equal to the first adjustment. Next, the given parent display object conveys an indication of the second adjustment to the child display object (block 920). The child display object can then make the second adjustment to its size. After block 920, method 900 ends.

Otherwise, if there is a parent above the first parent display object in the hierarchy (conditional block 910, "yes" leg), then the request is forwarded to a second parent display object which is a parent of the first parent display object (block 925). Next, the first parent display object receives a response from the second parent display object that a third adjustment is approved (block 930). The third adjustment can be greater than, less than, or equal to the first adjustment. Then, the first parent display object calculates a fourth adjustment based on the response from the second parent display object (block 935). The fourth adjustment can be greater than, less than, or equal to the third adjustment. Then, the given parent display object conveys an indication of the fourth adjustment to the child display object (block 940). The child display object can then make the fourth adjustment to its size. After block 940, method 900 ends. It is noted that there can be any number of parents above the first parent display object in the hierarchy, and the request can be forwarded through any number of higher layers. For example, in one implementation, the second parent display object forwards the request to a third parent display object, the third parent display object forwards the request to a fourth parent display object, and so on. The parent at the top of the hierarchy will make calculations which will filter back down through the hierarchy to inform objects in the lower layers of the pixels that are available.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a memory storing program instructions; and
   a processor coupled to the memory, wherein the program instructions are executable by the processor to:
      register a child display object with a scaling manager when the child display object is created;
      responsive to detection, by the scaling manager, of a display scaling event:
         calculate a first size change for the child display object based on the display scaling event; and
         cause an updated version of the child display object with a second size change to be driven to a first display device responsive to determining that a first parent display object can accommodate the second size change of the child display object.

2. The apparatus as recited in claim 1, wherein the second size change is different from the first size change.

3. The apparatus as recited in claim 2, wherein the program instructions are further executable by the processor to calculate the second size change, in response to determining that the first parent display object cannot accommodate the first size change of the child display object.

4. The apparatus as recited in claim 1, wherein the display scaling event corresponds to at least one of an updated display setting display setting, a change in resolution of a display, a change in font properties of a user interface, and a change from the first display device to a second display device.

5. The apparatus as recited in claim 1, wherein the program instructions are further executable by the processor to determine if there is a second parent display object above the first parent display object in a display object hierarchy.

6. The apparatus as recited in claim 5, wherein the program instructions are further executable by the processor to:
   determine if the second parent display object can accommodate the second size change; and
   calculate a third size change for the child display object responsive to determining that the second parent display object cannot accommodate the second size change, wherein the third size change is different from the second size change.

7. The apparatus as recited in claim 1, wherein when the display scaling event is detected, the scaling manager records a pre-scale factor and a post-scale factor associated with the display scaling event.

8. A method comprising:
   registering a child display object with a scaling manager when the child display object is created; and
   responsive to detecting, by the scaling manager, a display scaling event:
      calculating a first size change for the child display object based on the display scaling event; and
      causing an updated version of the child display object with a second size change to be driven to a first display device responsive to determining that a first parent display object can accommodate the second size change of the child display object.

9. The method as recited in claim 8, wherein the second size change is different from the first size change.

10. The method as recited in claim 9, further comprising calculating the second size change, in response to determining that the first parent display object cannot accommodate the first size change of the child display object.

11. The method as recited in claim 8, wherein the display scaling event corresponds to at least one of an updated display setting display setting, a change in resolution of a display, a change in font properties of a user interface, and a change from the first display device to a second display device.

12. The method as recited in claim 8, further comprising determining if there is a second parent display object above the first parent display object in a display object hierarchy.

13. The method as recited in claim 12, further comprising:
determining if the second parent display object can accommodate the second size change; and
calculating a third size change for the child display object responsive to determining that the second parent display object cannot accommodate the second size change, wherein the third size change is different from the second size change.

14. The method as recited in claim 8, further comprising recording, by the scaling manager, a pre-scale factor and a post-scale factor associated with the display scaling event responsive to detecting the display scaling event.

15. A system comprising:
a scaling manager configured to:
register a child display object when the child display object is created;
detect a display scaling event; and
a processor configured to:
calculate a first size change for the child display object based on the display scaling event; and
cause an updated version of the child display object with a second size change to be driven to a first display device responsive to determining that a first parent display object can accommodate the second size change of the child display object.

16. The system as recited in claim 15, wherein the second size change is different from the first size change.

17. The system as recited in claim 16, wherein the processor is further configured to calculate the second size change, in response to determining that the first parent display object cannot accommodate the first size change of the child display object.

18. The system as recited in claim 15, wherein the display scaling event corresponds to at least one of an updated display setting display setting, a change in resolution of a display, a change in font properties of a user interface, and a change from the first display device to a second display device.

19. The system as recited in claim 15, wherein the processor is further configured to determine if there is a second parent display object above the first parent display object in a display object hierarchy.

20. The system as recited in claim 19, wherein the processor is further configured to:
determine if the second parent display object can accommodate the second size change; and
calculate a third size change for the child display object responsive to determining the second parent display object cannot accommodate the second size change, wherein the third size change is different from the second size change.

* * * * *